United States Patent [19]

Bock

[11] 3,894,067

[45] July 8, 1975

[54] PRODUCTION OF PENICILLAMINE-MERCURIC-MERCAPTIDE AND OF PENICILLAMINE AND ACID ADDITION SALTS OF PENICILLAMINE

[75] Inventor: Manfred Bock, Berlin, Germany

[73] Assignee: Firma Heyl & Co. Chemisch-Pharmazeutische Fabrik, Berlin, Germany

[22] Filed: Mar. 22, 1972

[21] Appl. No.: 236,962

[30] Foreign Application Priority Data

Mar. 24, 1971 Germany.............................. 2114329

[52] U.S. Cl. .............. 260/431; 260/239.1; 260/534
[51] Int. Cl. ................................................ C07f 3/10
[58] Field of Search ..................................... 260/431

[56] References Cited
UNITED STATES PATENTS 3,281,461  10/1966  Restivo et al.................... 260/534 S

FOREIGN PATENTS OR APPLICATIONS 854,339  11/1960  United Kingdom ............. 260/534 S

OTHER PUBLICATIONS

Chemical Abstracts, Vol. 57, 5578a (1962).

Chemical Abstracts, Vol. 61, 5754h–5755a (1964).

Chemical Abstracts, Vol. 73, 13988k (1970).

*Primary Examiner*—Helen M. S. Sneed
*Attorney, Agent, or Firm*—Steinberg and Blake

[57] ABSTRACT

This invention relates to the production of a new compound, penicillamine-mercuric-mercaptide, which serves as an excellent intermediate in the production of penicillamine and acid addition salts of penicillamine. The penicillamine-mercuric-mercaptide is produced by the reaction of penicilloic acid or penilloic acid with a mercuric salt, such as mercury (II) chloride in a mol ratio of 1:0.3 – 1:0.7 in a medium of an organic solvent and water. The formed intermediate compound, penicillamine-mercury(II)-mercaptide can easily be decomposed by means of hydrogen sulfide to penicillamine.

6 Claims, No Drawings

PRODUCTION OF PENICILLAMINE-MERCURIC-MERCAPTIDE AND OF PENICILLAMINE AND ACID ADDITION SALTS OF PENICILLAMINE

BACKGROUND OF THE INVENTION

The production of the penicillamine by the hydrolytic decomposition of penicillin is known.

According to British Pat. No. 854,339, penicillins are converted by alkaline hydrolysis into the corresponding penicilloic acid. This is then isolated after extraction with an organic solvent such as n-butanol and by decarboxylation at increased temperature under lowered pressure converted into the corresponding penilloic acid.

The sodium salt of the penilloic acid is reacted with a mercuric halogenide, for example mercuric chloride, or a mercuric salt in the presence of halogen ions in aqueous solution. This results in the formation of a penicillamine-mercuric-halogenide-complex compound which is isolated by filtration and then thoroughly freed from the formed by-product penilloaldehyde and the inorganic salt by washing and suspending.

The complex is suspended in water and reacted with hydrogen sulfide. The mercury sulfide precipitates and is filtered off. The filtrate is concentrated by drying under vacuum. Penicillamine-hydrochloride is thus obtained. This is reacted with acetone for purification purposes. This results in the formation of penicillamineisopropylidine-hydrochloride which is again converted to penicillamine-hydrochloride by means of a mineral acid such as hydrochloric acid at increased temperature.

In accordance with U.S. Pat. No. 3,281,461, a penicillin is hydrolized in alkaline medium to the corresponding penicilloic acid which, by means of a strong acid such as hydrochloric acid is decarboxylated to the corresponding penilloic acid. By the reaction of the penilloic acid with mercuric chloride as the mercury(II)-salt, there is thus obtained the mercuric chloride complex of the penicillamine which is kept in solution by the addition of acid.

The corresponding penilloaldehyde is obtained as by-product. Since this decreases the yield of penicillamine, it must be removed. This can be accomplished by extraction by means of an organic solvent such as chloroform, ethyl acetate or methylene chloride, or by reaction with a carbonyl group-containing reagent such as hydroxylamine, semicarbazide or hydrazine. This compound forms with the penilloaldehyde an insoluble derivative at increased temperature which after renewed addition of mineral acid is filtered.

The solution freed from the penilloaldehyd is reacted with hydrogen sulfide, the resulting mercury sulfide is filtered off and the filtrate mixed with an organic solvent such as a short chain ester or alcohol, and the water is then removed by distillation. There is thus obtained crude penicillamine-hydrochloride. This can be purified through formation of the isopropylidene-derivative by reaction with acetone, and the said derivative decomposed with hydrochloric acid.

The known methods exhibit several disadvantages. In the first place it is necessary to operate with large volumes of reaction solutions since the utilized mercury compounds are relatively insoluble in water. Furthermore, it is necessary to operate with a mol ratio of mercury compound to penicilloic acid or penilloic acid of at least 1:1. This means that relatively large amounts of the mercury compounds must be utilized. This is disadvantageous since the mercury compounds are expensive throughout the world.

SUMMARY OF THE INVENTION

Generally speaking, in accordance with the present invention, a method is provided which utilizes smaller amounts of mercury compounds and which avoids the disadvantages of the known processes for the production of penicillamine and acid addition salts thereof.

It is accordingly a primary object of the present invention to provide a method which can utilize considerably smaller amounts of liquid volumes for the reaction solutions and which also utilizes smaller amounts of mercury compounds.

It is another object of the present invention to provide for the production of a new intermediate, namely penicillamine-mercuric-mercaptide, which intermediate is useful in the production of penicillamine and acid addition salts of penicillamine.

It is yet a further object of the present invention to provide a method of producing penicillamine and acid addition salts thereof, which method provides for the production of a new intermediate by controlled molecular ratios of penicilloic acid or penilloic acid to mercuric salt and by the use of aqueous-organic solvent mediums.

Other objects and advantages of the present invention will be apparent from a further reading of the specification and of the appended claims.

With the above and other objects in view, the present invention mainly comprises the production of penicillamine-mercuric-mercaptide by the reaction of penicilloic acid or penilloic acid with a mercuric salt in a mol ratio of 1:0.3 and 1:0.7, preferably, 1:0.5, in a medium of at least one organic solvent and water. The invention further comprises the decomposition of the formed penicillamine-mercuric-mercaptide by means of hydrogen sulfide to penicillamine which can then be recovered in known manner.

The method of the present invention utilizes considerably smaller volumes of liquid in the reaction solutions, as little as one-tenth of that required according to known processes. This is achieved as a result of the following considerations:

At 20° C, one can dissolve 50 g of mercuric chloride in 100 g of alcohol, as compared to only 7.4 g of mercuric chloride in 100 g of water. Thus, it is possible to operate with a concentrated solution and smaller volumes are also possible since the mol ratio of the reactants according to the invention is lower than mol ratios according to known processes.

Another disadvantage of the known process which is avoided according to the present invention, is that the initial product of the process, the produced penicillamine-mercuric-complex compound does not precipitate in crystalline form. It is consequently difficult to purify the same, particularly to free it from penilloaldehyde so that in the further working up of the complex compound to penicillamine the yield is decreased.

The penicilloic acid or penilloic acid which is reacted with the mercuric salt in a mol ratio of 1:0.3–1:0.7, and water, may be obtained from any source, for example a. penicilloic acid obtained as an intermediate during hydrolysis, or b. penilloic acid obtained by decarboxylation of penicilloic acid.

The organic solvent which is utilized along with some water as the reaction medium in the method of the invention should be a water miscible organic solvent. The most suitable of such organic solvents are methanol, ethanol and acetone.

The penicillamine-mercuric-mercaptide is decomposed, if necessary, in acid medium by means of hydrogen sulfide, to penicillamine, and the penicillamine-containing solution is evaporated to dryness under vacuum.

It is suitable to carry out the reaction calculated with respect to the number of base equivalents, since the number of acid functions of the penicilloic acid or penilloic acid correspond. The highest yield of penicillamine-mercuric-mercaptide is obtained utilizing a mol ratio of 1:0.5, although the reaction can be carried out utilizing mol ratios between 1:0.3 and 1:0.7.

The penicillamine-mercuric-mercaptide is a new substance. This substance exhibits the advantage as compared to the known complex compounds of being more easily available and it therefore serves as a suitable starting material for the production of the penicillamine.

A particular advantage of the invention as compared to the known process is achieved as a result of the fact that the penilloaldehyde which is obtained as a by-product of the decomposition by the mercury compound can be removed in a simpler manner from the reaction medium. This remains as acetal in solution and can without particular difficulty be separated from the crystalline precipitated penicillamine-mercuric-mercaptide by filtration and removed from the residue by washing with aqueous alcohol.

It is still a further advantage of the present invention that the penicillamine-mercuric-mercaptide which is produced according to the invention can be recrystallized from water in simple manner. A method step of this type is not possible in the case of the complex formation which occurs in the known processes.

To further work up the penicillamine-mercuric-mercaptide which is produced according to the present invention, the same is suspended in water or an organic solvent. Hydrogen sulfide is then introduced. The precipitated mercuric sulfide is filtered off, and to increase the yield penicillamine is washed out of the same. The washing liquor is purified along with the main filtrate which contains the penicillamine. The penicillamine is obtained by evaporation of the filtrate under vacuum.

The base is thus directly obtained, which is a particular advantage as compared to the prior art which only results in the obtaining of the penicillamine hydrochloride. If it is desired to obtain the penicillamine hydrochloride in the method of the present invention, then the mercaptide is worked up in accordance with the invention in hydrochloric acid solution. The mercaptide is dissolved in hydrochloric acid and the process proceeds as previously described. Evaporation of the filtrate results in the obtaining of the penicillamine hydrochloride. This can be reconverted to the penicillamine base by reaction of the hydrochloride with a suitable base such as dimethylamine in alcoholic solution. The penicillamine base is obtained in crystalline form.

It should further be noted that the method of the present invention differs from the known methods in that the method of the invention can proceed starting not only with penilloic acid, but also its precursor, namely with penicilloic acid.

DESCRIPTION OF PREFERRED EMBODIMENTS

The following examples are given to further illustrate the present invention. The scope of the invention, is not, however, meant to be limited to the specific details of the examples.

EXAMPLE 1 a. Production of penicillamine-mercuric-mercaptide from intermediate penicilloic acid 372 g of the potassium salt of penicillin-G (1 mol) are dissolved in 250 cc of water and 180 cc of 20% aqueous sodium hydroxide solution. This results in an increase in the temperature to 60°–70° C. After one-half hour 8.3 cc of concentrated hydrochloric acid of 1.19 density is added thereto. Then a mixture of 250 cc of 1 molar methanolic mercuric chloride solution and 83 cc of concentrated hydrochloric acid of 1.19 density are added dropwise under stirring, resulting in a decarboxylation. An additional 250 cc of 1 molar methanolic mercuric chloride solution are added thereto, resulting in the separation of crystalline penicillamine-mercuric-mercaptide.

The mercaptide is filtered off under suction, washed with 200 cc of 50% methanol and dried. There is thus obtained 194 g (78% of the theoretical) of penicillamine-mercuric-mercaptide.

b. Conversion of the mercaptide to penicillamine 248 g of penicillamine-mercuric-mercaptide (½ mol) is suspended in 1.2 liters of water. There is then added 1 cc of hydrochloric acid to improve the filterability of the sulfide precipitate. After the introduction of hydrogen sulfide, the precipitated mercury sulfide is filtered off and washed with 0.8 liters of water. The washing liquid is combined with the main filtrate and this is then evaporated to dryness. There is thus obtained 118 g of penicillamine, corresponding to 79% of the theoretical.

c. Conversion of the mercaptide to penicillamine-hydrochloride 248 g of penicillamine-mercuric-mercaptide (½ mol) are dissolved in 500 cc of water and 83 cc of concentrated hydrochloric acid of 1.19 density. After the introduction of hydrogen sulfide, the precipitated mercury sulfide is filtered off and washed with 1 liter of water. The washing liquor is combined with the main filtrate and this is evaporated to dryness under vacuum.

There is thus obtained 182 g of penicillamine-hydrochloride, corresponding to 98% of the theoretical.

d. Conversion of penicillamine-hydrochloride into penicillamine base

The hydrochloride obtained according to (c) above is dissolved in 250 cc of methanol, the solution filtered and the pH thereof adjusted to 3 with 80 cc of 40% aqueous dimethylamine solution. After the start of the crystallization an additional 35 cc of dimethylamine solution is added, the pH value increases to 4.5. The 50° C warm mixture is then cooled to about 0°–5° C. The course, glistening crystals are filtered off under suction, washed with 150 cc of 90% methanol and dried.

There is thus obtained 100 g of penicillamine, corresponding to 67% of the theoretical. The purity is greater than 99%.

EXAMPLE 2

Production of penicillamine-mercuric-mercaptide from intermediate penilloic acid a. 372 g of the potassium salt of penicillin-G (1 mol) are dissolved in 200 cc of water and 180 cc of 20% aqueous sodium hydroxide solution, resulting in warming to 60°–70° C. After one-half hour there is then slowly added dropwise and under stirring 100 cc of concentrated hydrochloric acid of 1.19 density at 80° C. After the termination of the decarboxylation, 16.5 cc of 20% aqueous sodium hydroxide solution are added. After cooling there is subsequently added dropwise 500 cc of 1 molar methanolic mercuric chloride solution. This results in the precipitation of crystalline penicillamine-mercuric-mercaptide. This is washed with 200 cc of 50% methanol and dried.

There is thus obtained 203 g of penicillamine-mercuric-mercaptide, which corresponds to 81% of the theoretical.

b. Instead of using the potassium salt of penicillin-G, the process is carried out with 356 g of the sodium salt of penicillin-G (1 mol), resulting in the same yield of penicillin-mercuric-mercaptide.

EXAMPLE 3

Production of penicillamine-mercuric-mercaptide from penilloic acid a. 326 g of benzylpenilloic acid-hydrate (1 mol) are dissolved in 250 cc of water and 168 cc of 20% aqueous sodium hydroxide solution and reacted under stirring slowly with 500 cc of 1 molar methanolic mercuric chloride solution. The precipitated crystals of penicillamine-mercuric-mercaptide are filtered off under suction, washed with 200 cc of 50% methanol and dried.

There is thus obtained 244 g of penicillamine-mercuric-mercaptide, which corresponds to 98% of the theoretical.

b. Instead of a methanolic mercuric chloride solution, 160 g of mercuric acetate in 1 liter of methanol, 0.5 liters of water and 30 cc of acetic acid are added. The results obtained are the same as in (a) above.

c. 250 cc of a 2-molar solution of mercuric chloride in methanol-acetone (1:1) are utilized. There is thus obtained 174 g of penicillamine-mercuric-mercaptide, which corresponds to 70% of the theoretical.

Althouth methanol, ethanol and acetone are preferred as solvents, other suitable solvents for the purposes of the present invention include dimethylformamide, dimethylsulfoxide, n-propanol, isopropanol and methylethyl ketone.

The ratio of organic solvent to water in the medium of organic solvent and water is preferably between 1:3 and 3:1. The most preferred ratio of organic solvent to water is 1:1.

The method of the invention can of course be carried out with other mercuric salts than mercuric chloride and mercuric acetate. Among these salts are the other mercuric halides, e.g. mercuric bromide and mercuric iodide, as well as mercuric salts of organic acid, such as mercuric formate and mercuric propionate.

While the invention has been illustrated in particular with respect to specific reactants and reaction conditions, it is apparent that variations and modifications can be made without departing from the spirit and scope thereof.

What is claimed is:

1. Method of producing penicillamine-mercuric-mercaptide, which comprises reacting a compound selected from the group consisting of penicilloic acid and penilloic acid with a mercuric salt in a mol ratio of 1:0.3 – 1:0.7 in a medium of at least one water miscible organic solvent and water in a ratio of organic solvent to water of between about 1:3 and 3:1, thereby forming penicillamine-mercuric-mercaptide in crystalline form which precipitates in such form from the solution and penilloaldehyde as by-product which remains dissolved in the solution, whereby the precipitated crystalline penicillamine-mercuric-mercaptide can be easily separated from the solution containing the by-product.

2. Method according to claim 1 wherein said mol ratio is 1:0.5.

3. Method according to claim 1 wherein said organic solvent is selected from the group consisting of methanol, ethanol and acetone.

4. Method according to claim 3 wherein the mol ratio is 1:0.5.

5. Method according to claim 1 wherein said mercuric salt in said medium is a 1 molar methanolic mercuric chloride solution.

6. Penicillamine-mercuric-mercaptide, a crystalline compound formed by the reaction of a compound selected from the group consisting of penicilloic acid and penilloic acid with a mercuric salt in a mol ratio of 1:0.3 – 1:0.7.

\* \* \* \* \*